(12) United States Patent
Servatius et al.

(10) Patent No.: US 6,700,712 B2
(45) Date of Patent: Mar. 2, 2004

(54) MULTIDIRECTIONAL SINGLE SURFACE OPTICALLY SHAPED FILM

(75) Inventors: James Servatius, Inver Grove Heights, MN (US); Robert T. Fehr, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 69 days.

(21) Appl. No.: 10/010,879

(22) Filed: Nov. 13, 2001

(65) Prior Publication Data

US 2003/0090813 A1 May 15, 2003

(51) Int. Cl.[7] .............................. G03B 21/60; G02B 3/08
(52) U.S. Cl. ........................ 359/742; 359/741; 359/454; 359/457
(58) Field of Search ................................ 359/741, 742, 359/454, 457

(56) References Cited

U.S. PATENT DOCUMENTS

| | | | |
|---|---|---|---|
| 3,908,056 A | 9/1975 | Anderson | 428/142 |
| 4,130,346 A | 12/1978 | Polley | 359/440 |
| 4,442,359 A | 4/1984 | Lederer | 250/342 |
| 4,478,769 A | 10/1984 | Pricone et al. | 264/1.6 |
| 4,609,259 A | 9/1986 | Suemitsu et al. | 355/53 |
| 4,730,897 A * | 3/1988 | McKechnie et al. | 359/452 |
| 4,733,943 A | 3/1988 | Suzuki et al. | 359/565 |
| 4,780,616 A * | 10/1988 | Nishi et al. | 250/548 |
| 4,896,953 A | 1/1990 | Cobb, Jr. | 549/408 |
| 5,122,903 A | 6/1992 | Aoyama et al. | 359/565 |
| 5,515,253 A | 5/1996 | Sjobom | 362/244 |
| 5,630,872 A * | 5/1997 | Ogi et al. | 106/287.18 |
| 5,631,057 A | 5/1997 | Sundet | 428/60 |
| 5,633,735 A * | 5/1997 | Hunter, Jr. et al. | 359/15 |
| 5,664,874 A | 9/1997 | Winterer | 362/191 |
| 5,780,140 A | 7/1998 | Nilsen | 428/172 |
| 5,840,407 A | 11/1998 | Futhey et al. | 428/167 |
| 6,097,549 A | 8/2000 | Jenkins et al. | 359/726 |
| 6,099,156 A | 8/2000 | Jenkins et al. | 362/511 |
| 6,253,442 B1 | 7/2001 | Benson et al. | 29/557 |
| 6,257,860 B1 | 7/2001 | Luttrell et al. | 425/193 |

FOREIGN PATENT DOCUMENTS

| | | |
|---|---|---|
| DE | 28 12 385 A1 | 10/1978 |
| DE | 29 37 975 A1 | 4/1981 |
| FR | 2 004 444 | 11/1969 |
| GB | 1 551 948 | 9/1979 |
| GB | 1 593 346 | 7/1981 |
| GB | 2 167 690 B | 6/1986 |
| GB | 2 169 315 B | 7/1986 |
| GB | 2 194 073 A | 2/1988 |
| JP | 55-121011 | 9/1980 |
| JP | 02 181131 | 7/1990 |
| JP | 3-196403 | 8/1991 |
| JP | 2000-19309 | 1/2000 |
| WO | WO 96/34302 | 10/1996 |
| WO | WO 99/01269 | 1/1999 |
| WO | WO 99/01275 | 1/1999 |

* cited by examiner

Primary Examiner—Gregoria Epps
Assistant Examiner—Tim Thompson

(57) ABSTRACT

A multidirectional single surface optically shaped film is disclosed. The optically shaped film may include a film having only one surface structure with two or more different, overlapping Fresnel patterns formed in the structured surface for use as thin, decorative film.

32 Claims, 4 Drawing Sheets

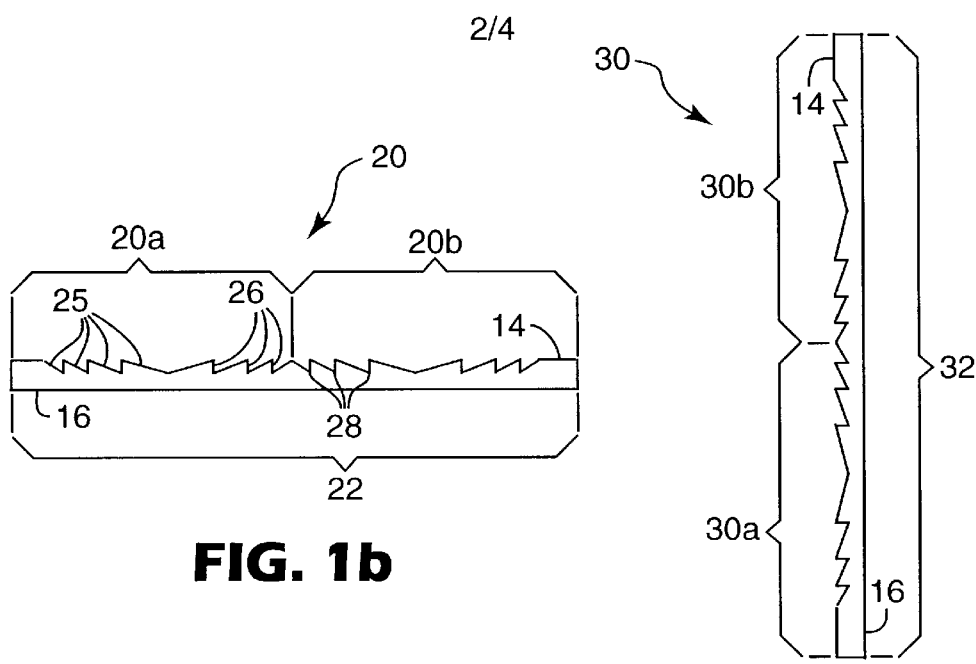
FIG. 1b
FIG. 1c
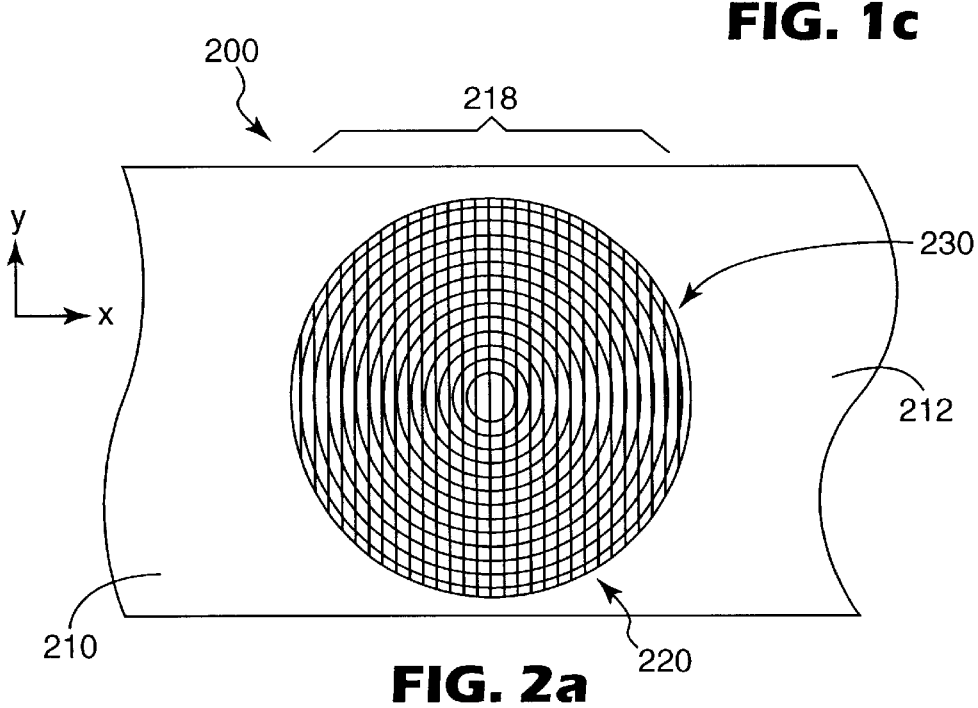
FIG. 2a
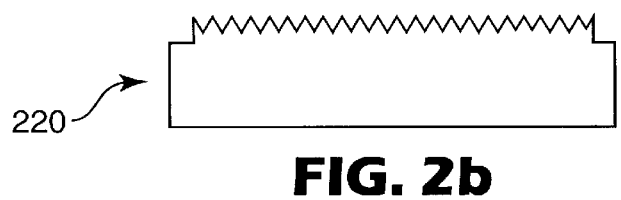
FIG. 2b

MULTIDIRECTIONAL SINGLE SURFACE OPTICALLY SHAPED FILM

FIELD OF THE INVENTION

The present invention relates to the field of optical films.

BACKGROUND

Microstructured transparent optical film has been used on glass, mirrors, vehicles, signs, ceilings and other surfaces for decorative purposes. One example is discussed in U.S. Pat. No. 5,840,407 to Futhey et al. in which a film used to simulate beveled glass is disclosed.

Commonly-assigned U.S. Pat. No. 3,908,056 to Anderson describes an optically decorative web that produces a real or virtual image that is other than that of an actual surface of the web. The Anderson optically decorative web is a strip of opaque or transparent polymeric material having a series of ridges and grooves on one side and a smooth surface on the other side. Examples of real or virtual images produced by the optically decorative web are metallic or transparent concave or convex surfaces, e.g., an arched ceiling which would be concave, giving the sensation of being in a room having a domed ceiling, a metallic strip on an automobile, molding on furniture, or the appearance of a semicylindrical glass or metallic bar extending across a glass panel.

Optically decorative films such as those taught by Anderson may include various structured lenticular Fresnel patterns. These thin Fresnel lensfilms can be designed to provide optical functionality similar to much thicker solid optical components. An incidental attribute of Fresnel lensfilm is that the lensfilm can appear macroscopically to have about the same amount of height or depth projection as the equivalent solid lens or prism surface. This characteristic can be utilized to produce thin decorative optically shaped film (OSF) that appears to be much thicker than its actual thickness. The surface of the OSF lensfilm can be a linear Fresnel prism or lens surface including an array of grooves having dimensions small enough to be not easily resolvable by the average unaided human eye. Typically, the depths of the majority of grooves in a Fresnel lensfilm design are held constant while the angle of one of the side walls (known as the facet angle) varies across the array, roughly matching at each location the angle of the solid prism or lens surface being simulated.

A Fresnel lensfilm often has structure only on one side—the opposite side being smooth—but it can also be made with structure on both sides. In some applications, this increases the design flexibility and functionality of a single piece of lensfilm. Certain double-sided lensfilm designs have uniquely attractive appearances potentially giving them added value over single sided films in decorative OSF applications as well. However, the cost of producing film with structure on both surfaces is typically greater than the cost of producing single-sided film. This additional cost may be enough to preclude the use of double-sided film in many applications including decorative OSF applications where cost constraints can be severe.

SUMMARY OF THE INVENTION

The present invention provides a film having only one surface structured with two or more different, overlapping Fresnel patterns formed in the structured surface for use as thin, decorative optically shaped film.

The overlapping Fresnel patterns of the present invention cause an interruption in the various patterns. This interruption provides a complex optical pattern that has unique optical properties.

Although at least a portion of each Fresnel pattern in the devices/films of the present invention is interrupted, for the purposes of the present invention, a Fresnel pattern is a pattern of facets and risers that, but for the interruptions, would form a Fresnel lens or Fresnel prism.

Among the advantages provided by the present invention is the provision of a decorative optical film having structure on only one side that appears (to a viewer located on the same side of the film as the structured surface) very similar to films having a structure on both sides.

The optical effect provided by the optical film of the present invention may be combined with various articles for purposes of decoration and/or for offering protection to the article or protection to people, alerting them to the presence of the article, e.g., large plate glass windows or doors. For example, optical film may be applied to windows or mirrors to simulate beveled cuts or other decorative effects. The optical film may also be used on motor vehicles or bicycles as reflective warning tape. The film may also be applied to clothing and outerwear as reflective warning tape for improved safety. The present invention also has several uses as decoration, e.g., ribbons, streamers, wrapping paper, bows, costumes, eyewear, etc.

In one aspect, the present invention provides an optical film that includes a substrate including a first major surface; a first group of facets corresponding to a first Fresnel pattern formed in a first portion of the first major surface of the substrate; and a second group of facets corresponding to a second Fresnel pattern formed in a second portion of the first major surface of the substrate, wherein the first Fresnel pattern overlaps the second Fresnel pattern in a selected area of the first major surface of the substrate, and further wherein the first Fresnel pattern and the second Fresnel pattern interrupt each other in the selected area.

In another aspect, the present invention provides an optical film that includes a substrate including a first major surface; a first group of facets corresponding to a first Fresnel pattern including a linear Fresnel pattern that includes a first longitudinal axis formed in a first portion of the first major surface of the substrate; and a second group of facets corresponding to a second Fresnel pattern including a linear Fresnel pattern that includes a second longitudinal axis formed in a second portion of the first major surface, wherein the first Fresnel pattern overlaps the second Fresnel pattern in a selected area of the first major surface of the substrate, wherein the first longitudinal axis forms an angle with the second longitudinal axis, and further wherein the first Fresnel pattern and the second Fresnel pattern interrupt each other in the selected area.

In another aspect, the present invention provides an optical film that includes a substrate including a first major surface; a first group of facets corresponding to a first Fresnel pattern including a linear Fresnel pattern that includes a first longitudinal axis formed in a first portion of the first major surface of the substrate; and a second group of facets corresponding to a second Fresnel pattern including a linear Fresnel pattern that includes a second longitudinal axis formed in a second portion of the first major surface of the substrate, wherein the first Fresnel pattern overlaps the second Fresnel pattern in a selected area of the first major surface of the substrate, wherein the first longitudinal axis forms an angle with the second longitudinal axis, wherein the angle is greater than 0 degrees, and further wherein the first Fresnel pattern and the second Fresnel pattern interrupt each other in the selected area.

In another aspect, the present invention provides an optical assembly that includes a base substrate; an optical film attached to the base substrate that includes a film substrate including a first major surface; a first group of facets corresponding to a first Fresnel pattern formed in a first portion of the first major surface of the film substrate; and a second group of facets corresponding to a second Fresnel pattern formed in a second portion of the first major surface of the film substrate, wherein the first Fresnel pattern overlaps the second Fresnel pattern in a selected area of the first major surface of the film substrate, and further wherein the first Fresnel pattern and the second Fresnel pattern interrupt each other in the selected area.

These and other features and advantages of the present invention may be discussed below in connection with various illustrative embodiments of the invention.

BRIEF DESCRIPTION OF THE DRAWINGS

FIG. 1b is a cross-sectional view of the bottom edge of the optical film of FIG. 1a, taken along line 1b—1b.

FIG. 1c is a cross-sectional view of the side edge of the optical film of FIG. 1a.

FIG. 2a is a plan view of an alternative optical film according to the present invention.

FIG. 2b is a cross-sectional view of the bottom edge of the optical film of FIG. 2a.

DETAILED DESCRIPTION OF ILLUSTRATIVE EMBODIMENTS OF THE INVENTION

Figure 1A:
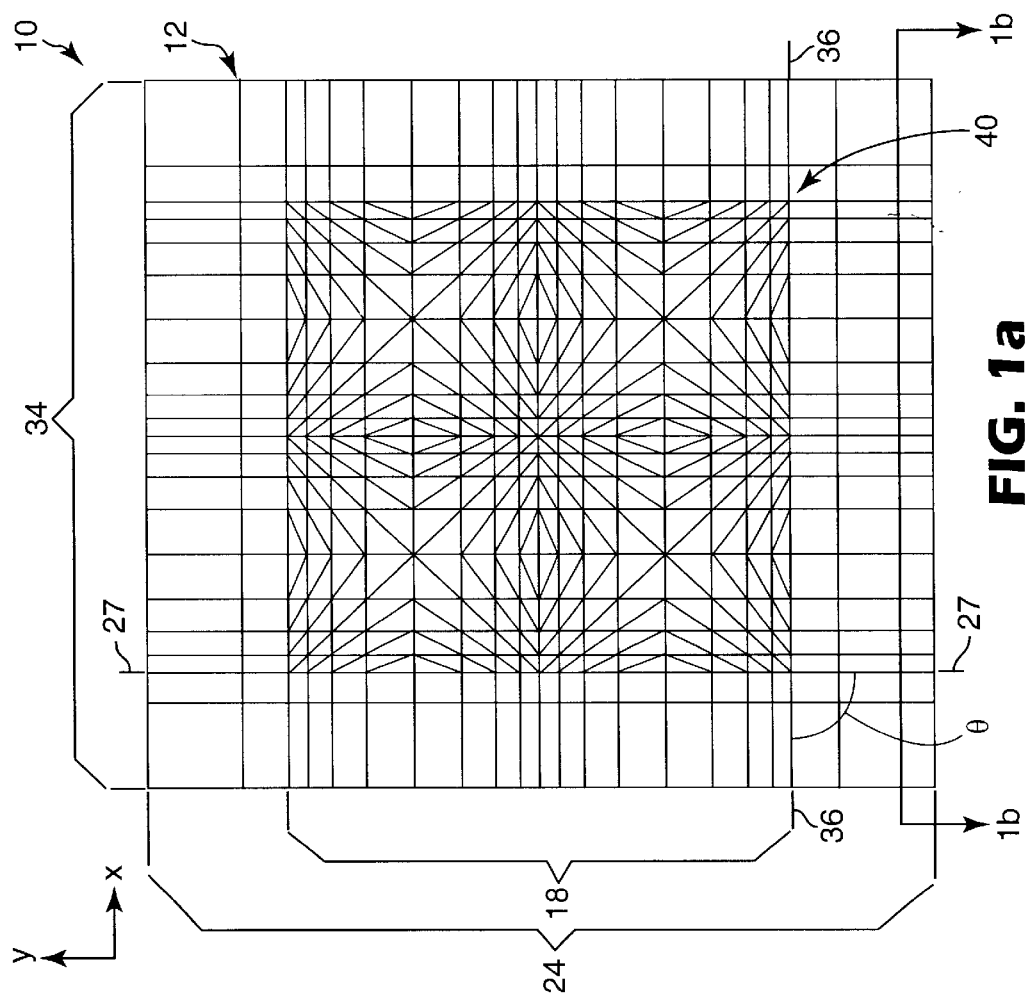
FIG. 1a is a plan view of one optical film of the present invention.

To the unaided eye, a single-sided film having a Fresnel pattern no deeper than a typical single-surface Fresnel lensfilm appears very similar to a film having both sides structured, i.e., each side cut with one of the same two patterns. Not all of the optical properties of the two films are the same, but the appearance and, therefore, the decorative OSF properties of single-sided and two-sided films are very similar.

From a ray tracing point of view, a primary difference in optical properties between a single-sided and a two-sided film may be attributed to the fact that the direction of a single normally incident ray of light can be redirected in a controlled refraction by a single-sided lensfilm only once. Further, that redirection can occur only in one direction that is parallel to one or the other of two planes that are orthogonal to the film.

In contrast, a similar ray of light incident on a two-sided lensfilm with linear grooves on both sides, for example grooves oriented perpendicularly to linear grooves on the opposite side, can be redirected by refraction in many more directions. In spite of these limitations for a single-sided film of the present invention, the appearances provide advantages for decorative purposes.

Where two or more overlapping Fresnel patterns are formed into the same surface, an array of structured surface features may be formed. If the intersecting grooves are V-shaped grooves (that include, e.g., typical linear Fresnel lensfilm designs having matched groove depths) and the angle of intersection between patterns is 90 degrees, an array of rectangular based pyramidal surface features will be the result. Where groove heights differ between intersecting grooves, wedge and other more complex shaped features may be formed.

In some areas of the illustrative crosscut surfaces described in more detail below, a difference in groove height may occur between the intersecting linear Fresnel patterns. This is because the central grooves of each cycle in each of these patterns may have somewhat smaller groove heights than the grooves further away from the center that are taller and fairly constant in height.

Each face or "facet" of every feature formed in a crosscut surface may be aligned in the same plane as a wall of a groove in one of the linear Fresnel component patterns of the surface. The steep adjacent facets seen on most features correspond to the vertical walls or "risers" of each of the overlapping linear Fresnel pattern grooves. Each line of coplanar facets of a row of neighboring features may be thought of as a wall of one groove of a component linear Fresnel pattern with notches that are spaced a distance equal to the groove spacing of the intersecting pattern. The discontinuities in the groove wall caused by the notches are preferably too closely spaced to be seen individually by the unaided human eye. The surface's rectangular array of rows and columns of features, with coplanar facets corresponding to the walls of a number of adjacent parallel and intersecting grooves together, give the surface its unique overall appearance, which is a combination of the collective macroscopic appearances of each of the microscopic component linear Fresnel patterns.

FIGS. 1a–1c depict one illustrative embodiment of an optical film according to the present invention. Referring to FIGS. 1a–1c, the optical film 10 includes a substrate 12 having a first major surface 14 and a second major surface 16. The substrate 12 may be manufactured of any suitable material, e.g., plasticized polyvinyl chloride, polycarbonate, cellulose acetate butyrate, methylmethacrylate, polystryrene, etc. It may, however, be preferred that the materials be transparent or translucent to light, and perhaps more preferably transparent or translucent to light that is visible to the unaided human eye.

A first group of facets 22 corresponding to a first Fresnel pattern 20 is formed in a first portion 24 of the first major surface 14 of substrate 12 parallel to the y-axis direction. And a second group of facets 32 corresponding to a second Fresnel pattern 30 is formed in a second portion 34 of the first major surface 14 of substrate 12 parallel to the x-axis direction.

The first Fresnel pattern 20 includes Fresnel patterns 20a and 20b that are formed adjacent to one another in the first major surface 14 as seen in the cross-sectional view in FIG. 1b. Similarly, the second Fresnel pattern 30 includes Fresnel patterns 30a and 30b that are formed adjacent to one another in the first major surface 14 as seen in the cross-sectional view of FIG. 1c.

Patterns 20a, 20b, 30a, and 30b may be the same Fresnel pattern or they may vary. Further, the optical film 10 may include a plurality of Fresnel patterns formed adjacent to one another across the substrate 12, whereby the same Fresnel pattern is repeated, or differing Fresnel patterns may alternate across the substrate 12.

The first Fresnel pattern 20 and the second Fresnel pattern 30 include a series of V-shaped grooves that are formed in the substrate 12. As depicted in this embodiment, the V-shaped grooves have a constant depth, forming notches 28 in the substrate 12. As can be seen in FIG. 1b, the V-shaped grooves include facets 25 and risers 26. The facets 25 may include various slopes. In addition, the pitch for each pattern is defined as the distance between each notch 28. As can be seen in FIGS. 1a–1c, the pitch of this embodiment is variable, i.e., the distance between notches 28 varies across both the first Fresnel pattern 20 and the second Fresnel pattern 30. However, any suitable pattern may be formed by either varying or holding constant the pitch, notch depth, facet slope, etc.

The first Fresnel pattern 20 overlaps the second Fresnel pattern 30 in a selected area 18 of the first major surface 14 of the substrate 12. In the selected area 18, the first Fresnel pattern 20 and the second Fresnel pattern 30 interrupt each other, creating a new, complex pattern.

The interruptions between the first Fresnel pattern 20 and second Fresnel pattern 30 that take place in the selected area 18 of the first major surface 14 may vary based on the amount of overlap between the first Fresnel pattern 20 and the second Fresnel pattern 30. For example, the selected area 18 may include the entire first portion 24 and some of the second portion 34, or the selected area 18 may include all of the second portion 34 and some of the first portion 24. In FIG. 1a, for example, the selected area 18 includes some of both the first portion 24 and second portion 34; however, neither the first portion 24 nor the second portion 34 is completely overlapped.

Further, both the first Fresnel pattern 20 and second Fresnel pattern 30 may include a variety of types of patterns, e.g., linear, annular, radial, etc. These patterns may be lens patterns or prism patterns. For example, as depicted in FIG. 1a, both the first Fresnel pattern 20 and the second Fresnel pattern 30 are linear Fresnel lens patterns. The first Fresnel pattern 20 is in the form of a linear pattern aligned along a first longitudinal axis 27 that is parallel to the y-axis. The second Fresnel pattern 30 is in the form of a linear pattern aligned along a second longitudinal axis 36 that is parallel to the x-axis.

The first longitudinal axis 27 and the second longitudinal axis 36 form an angle θ that in this embodiment is equal to 90 degrees. However, the angle between the first longitudinal axis 27 and the second longitudinal axis 36 may vary. At the lower end, however, it may be preferred that the angle θ be greater than zero degrees. At the upper end, it may be preferred that the angle θ be less than 180 degrees. It may also be preferred that the angle θ may be about 90 degrees. Varying the angle θ between each linear pattern may produce complex patterns having unique optical properties.

As depicted in FIGS. 1b–1c, the second major surface 16 of the substrate 12 is smooth, i.e., without any optically-active structures. The second major surface 16 may, however, also be structured, e.g., the second major surface 16 may include Fresnel patterns, microreplicated surfaces, etc.

Further, the optical film 10 of the present invention may be combined with various types of coatings and layers to achieve varying results, e.g., reflective coatings, pressure sensitive adhesives, etc.

For example, another optical film substantially made of transparent polymeric material and having a high index of refraction may be applied on the first Fresnel pattern 20 and second Fresnel pattern 30 to protect the facets from damage by external elements. Further, optical film 10 may also include a reflective layer applied on the second major surface 16 of substrate 12 that would reflect light transmitted through the substrate 12 back through the first Fresnel pattern 20 and second Fresnel pattern 30.

As mentioned above, the respective Fresnel patterns may include a variety of shapes. One variation is depicted in FIGS. 2a–2b, where optical film 200 includes a substrate 210 having a first major surface 212. A first Fresnel pattern 220 is provided in the first major surface 212. The first Fresnel pattern 220 is in the form of a linear pattern that is aligned with the y-axis. As shown in the cross-sectional view provided in FIG. 2b, the first Fresnel pattern 220 has a constant pitch, i.e., the distance between each notch in each V-shaped groove is held substantially constant as the pattern is formed in the first major surface 212 of the substrate 210.

A second Fresnel pattern 230 in the form of an annular pattern is also provided in the first major surface 212 of substrate 210. The annular pattern includes a plurality of concentric circles having increasing radii as formed by the notches that are provided in the first major surface 212. The second Fresnel pattern 230 has a constant pitch, i.e., the distance between each concentric circle as formed by the V-shaped grooves is held substantially constant when moving radially through the pattern 230.

Although the pitches of the first Fresnel pattern 220 and second Fresnel pattern 230 are constant, the pitch of either or both patterns may be varied such that the distance between notches varies as each pattern is formed in the first major surface 212. Such variations in pitch may typically be associated with Fresnel lens patterns, while Fresnel patterns with constant pitch are typically associated with Fresnel prism patterns.

The first Fresnel pattern 220 and the second Fresnel pattern 230 interrupt each other in a selected area 218 of the first major surface 212. In the depicted embodiment, the selected area 218 is coextensive with the area occupied by the first Fresnel pattern 220 and the second Fresnel pattern 230. The interruption of both patterns in the selected area 218 creates a new pattern in the first major surface 212 that may have unique optical properties.

Figure 3:
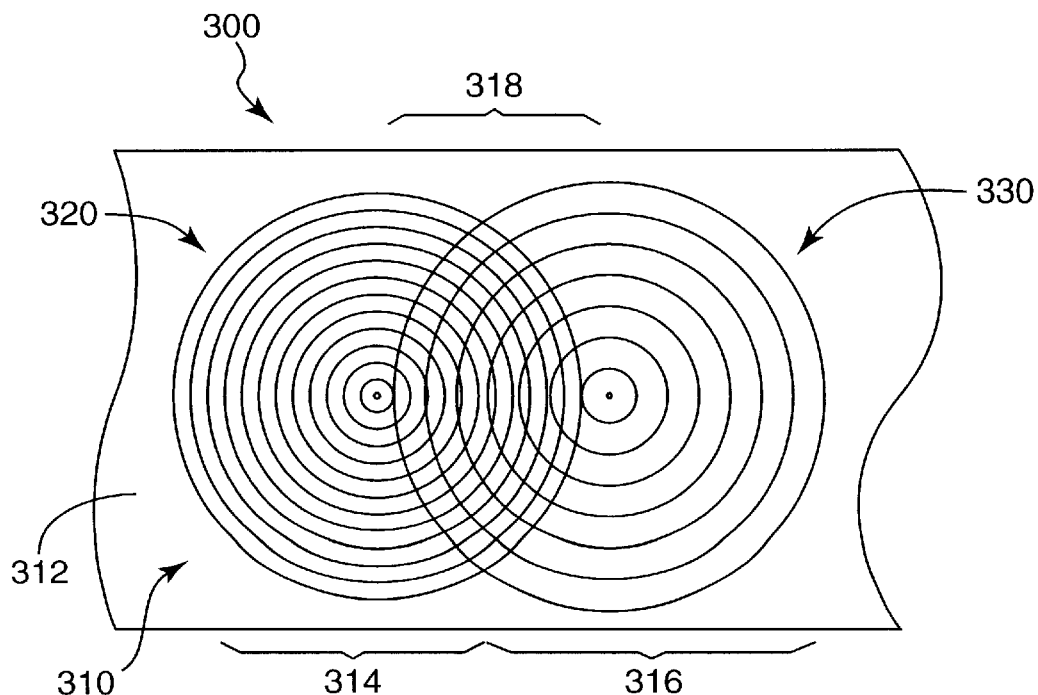
FIG. 3 is a plan view of an alternative embodiment of the optical film according to the present invention.

FIG. 3 illustrates another embodiment of the present invention where both a first Fresnel pattern 320 and a second Fresnel pattern 330 are in the form of annular patterns. The first Fresnel pattern 320, which is formed in a first portion 314 of a first major surface 312 of substrate 310, has a constant pitch, i.e., the distance between concentric circles in the pattern is the same between each concentric circle. The second Fresnel pattern 330, which is formed in a second portion 316 of the first major surface 312, also has a constant pitch. However, as depicted in FIG. 3, the pitch of the first Fresnel pattern 320 is not equal to the pitch of the second Fresnel pattern 330.

Unlike FIG. 2a, the two patterns 320 and 330, which interrupt each other in selected area 318, do not completely overlap in the selected area 318. Instead, a substantial amount of both the first Fresnel pattern 320 and the second Fresnel pattern 330 remain uninterrupted. In other words, the first portion 314 of the first major surface 312 of substrate 210 does not completely overlap the second portion 316.

Figure 4:
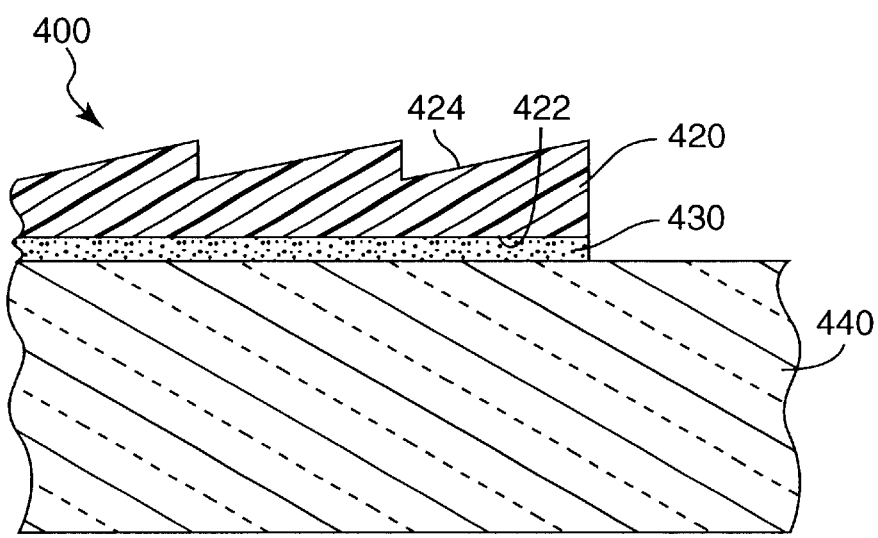
FIG. 4 is a cross-sectional view of an optical film assembly of the present invention.

The optical film of the present invention may also be attached to, e.g., glass or mirrored surfaces as, e.g., decoration. As depicted in FIG. 4, an optical film assembly 400 according to the present invention includes an optical film 420 and a base substrate 440. Optical film 420 has a smooth second major surface 422 and a first major surface 424 opposite the second major surface 422. First major surface 424 of optical film 420 includes some structure forming an optical pattern of the present invention. The base substrate 440 may be a portion of any suitable optical structure, e.g., a window, mirror, optical display panel (e.g., LCD display), etc. The base substrate 440 may be manufactured of any suitable material or materials, e.g., glass, mirror, metal, polymeric material, etc.

Optical film 420 may be applied to the surface of base substrate 440 by, e.g., an adhesive 430. The adhesive 430 may be, e.g., applied to the optical film 420 with a removable liner to produce an optical tape for easy application to the base substrate 440. In such an embodiment, the liner is removed and the optical tape is positioned over the area of the base substrate 440 where the decorative effect is desired.

The adhesive may be, e.g., a transparent, pressure sensitive adhesive, such as silicone pressure sensitive adhesives, (meth)acrylic pressure sensitive adhesives and rubber-based pressure sensitive adhesives. A suitable example of transparent pressure sensitive adhesives includes, 3M Repositionable Tape 666 double coated tape manufactured by Minnesota Mining and Manufacturing Company, St. Paul, Minn. One specific example of a suitable transparent pressure sensitive adhesive is a poly(meth)acrylic pressure sensitive adhesive derived from between about 0 and about 20 weight percent of acrylic acid and between about 100 and about 80 weight percent of at least one of isooctyl acrylate, 2-ethyl-hexyl acrylate or n-butyl acrylate composition, for example a pressure sensitive adhesive derived from between about 2 and about 10 weight percent acrylic acid and between about 90 and about 98 weight percent of isooctyl acrylate.

Figure 5:
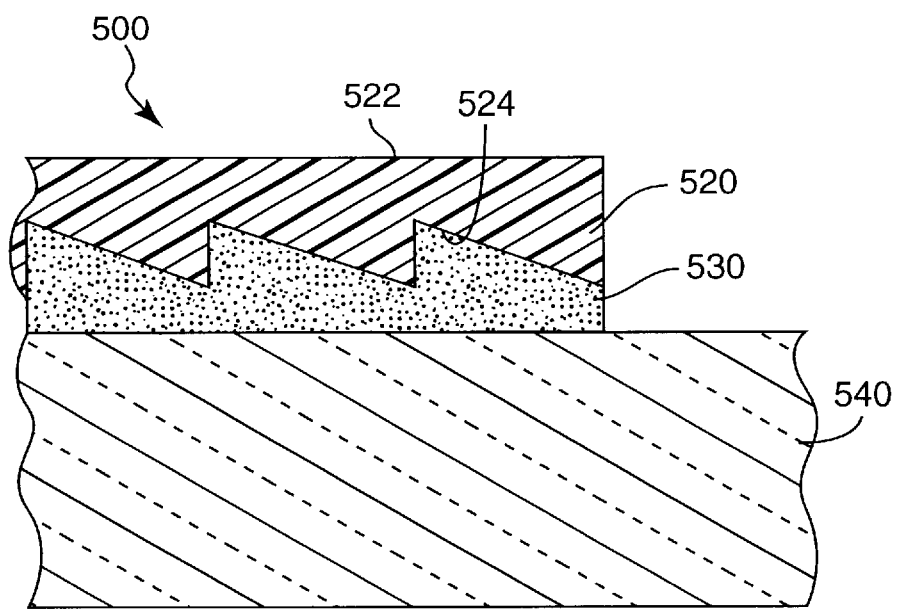
FIG. 5 is a cross-sectional view of another optical film assembly of the present invention.

An alternative optical film assembly 500 according to the present invention is depicted in FIG. 5 and includes an optical film 520 and a base substrate 540. Optical film 520 may also include a smooth second major surface 522 and a first major surface 524 opposite the second major surface 522. First major surface 524 of optical film 520 includes some structure forming an optical pattern of the present invention. The base substrate 540 may be a portion of any suitable optical structure, e.g., a window, mirror, optical display panel (e.g., LCD display), etc. The base substrate 540 may be manufactured of any suitable material or materials, e.g., glass, mirror, metal, polymeric material, etc.

Optical film 520 may be applied to the surface of substrate 540 by, e.g., an adhesive 530 with the first major surface 524 facing the substrate 540. It may be preferred that the adhesive 530 fill the structures formed in the first major surface 524 as shown such that substantially no air gaps are located between the optical film 520 and the base substrate 540. As discussed in connection with the embodiment depicted in FIG. 4, the adhesive 530 may be, e.g., applied to the optical film 520 with a removable liner to produce an optical tape for easy application to the base substrate 540. In such an embodiment, the liner is removed and the optical tape is positioned over the area of the base substrate 540 where the decorative effect is desired.

Figure 6:
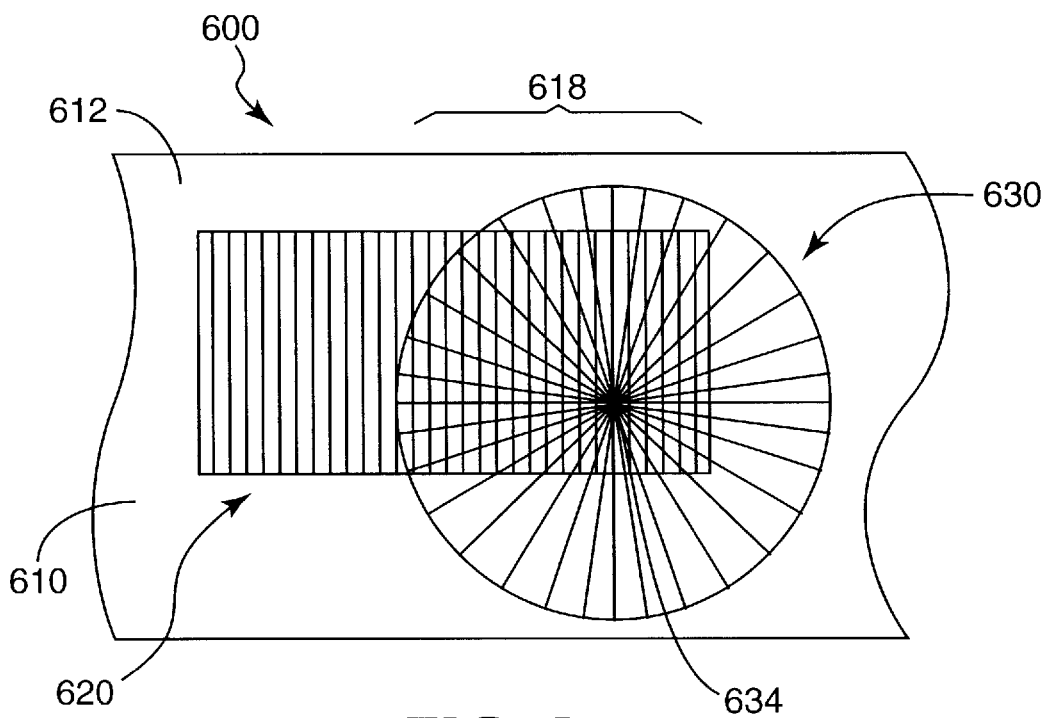
FIG. 6 is a plan view of an alternative embodiment of the optical film according to the present invention.

As mentioned above, the Fresnel patterns formed according to the present invention may include any suitable configuration, i.e., linear, annular, radial, etc. An embodiment illustrating a radial Fresnel pattern is depicted in FIG. 6. In FIG. 6, a first Fresnel pattern 620 is a linear Fresnel pattern formed in a first major surface 612 of substrate 610. A second Fresnel pattern 630 is also formed in the first major surface 612 in the form of a radial Fresnel pattern, i.e., a pattern whose V-shaped grooves are formed such that the notches radiate outward from a center 634. The first Fresnel pattern 620 overlaps the second Fresnel pattern 630 in a selected area 618 of the first major surface 612. The overlapping interrupts both Fresnel patterns, forming a complex pattern. The optical properties of the complex pattern are unique and provide for varied uses similar to those described above.

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of this invention, and it should be understood that this invention is not limited to the illustrative embodiments set forth herein. Accordingly, the invention is to be limited only by the claims provided below.

What is claimed is:

1. An optical film comprising:
   a substrate comprising a first major surface;
   a first group of facets corresponding to a first Fresnel pattern formed in a first portion of the first major surface of the substrate; and
   a second group of facets corresponding to a second Fresnel pattern formed in a second portion of the first major surface of the substrate, wherein the first and second Fresnel patterns are refractive Fresnel patterns, and wherein the first Fresnel pattern overlaps the second Fresnel pattern in a selected area of the first major surface of the substrate, and further wherein the first Fresnel pattern and the second Fresnel pattern interrupt each other in the selected area.

2. The optical film of claim 1, wherein the selected area comprises all of the first portion.

3. The optical film of claim 1, wherein the selected area comprises all of the second portion.

4. The optical film of claim 1, wherein the first Fresnel pattern comprises a linear Fresnel pattern.

5. The optical film of claim 1, wherein the second Fresnel pattern comprises a linear Fresnel pattern.

6. The optical film of claim 1, wherein the first Fresnel pattern comprises an annular Fresnel pattern.

7. The optical film of claim 1, wherein the second Fresnel pattern comprises an annular Fresnel pattern.

8. The optical film of claim 1, wherein the first Fresnel pattern comprises a radial Fresnel pattern.

9. The optical film of claim 1, wherein the second Fresnel pattern comprises a radial Fresnel pattern.

10. The optical film of claim 1, wherein the first Fresnel pattern comprises a Fresnel prism.

11. The optical film of claim 1, wherein the second Fresnel pattern comprises a Fresnel prism.

12. The optical film of claim 1, wherein the first Fresnel pattern comprises a Fresnel lens.

13. The optical film of claim 1, wherein the second Fresnel pattern comprises a Fresnel lens.

14. The optical film of claim 1, further comprising a layer of adhesive located on the first major surface of the substrate.

15. The optical film of claim 1, further comprising a layer of adhesive located on the second major surface of the substrate.

16. An optical film comprising:
   a substrate comprising a first major surface;
   a first group of facets corresponding to a first Fresnel pattern comprising a linear Fresnel pattern comprising a first longitudinal axis formed in a first portion of the first major surface of the substrate; and a second group of facets corresponding to a second Fresnel pattern comprising a linear Fresnel pattern comprising a second longitudinal axis formed in a second portion of the first major surface, wherein the first Fresnel pattern overlaps the second Fresnel pattern in a selected area of the first major surface of the substrate, wherein the first longitudinal axis forms an angle with the second longitudinal axis, and further wherein the first Fresnel pattern and the second Fresnel pattern interrupt each other in the selected area.

17. The optical film of claim 16, wherein the selected area comprises all of the first portion.

18. The optical film of claim 16, wherein the selected area comprises all of the second portion.

19. The optical film of claim 16, wherein the angle is greater than 0 degrees.

20. The optical film of claim 16, wherein the angle is about 90 degrees.

21. The optical film of claim 16, wherein the angle is less than 180 degrees.

22. The optical film of claim 16, wherein the first Fresnel pattern comprises a Fresnel prism.

23. The optical film of claim 16, wherein the second Fresnel pattern comprises a Fresnel prism.

24. The optical film of claim 16, wherein the first Fresnel pattern comprises a Fresnel lens.

25. The optical film of claim 16, wherein the second Fresnel pattern comprises a Fresnel lens.

26. An optical film comprising:

a substrate comprising a first major surface;

a first group of facets corresponding to a first Fresnel pattern comprising a linear Fresnel pattern comprising a first longitudinal axis formed in a first portion of the first major surface of the substrate; and a second group of facets corresponding to a second Fresnel pattern comprising a linear Fresnel pattern comprising a second longitudinal axis formed in a second portion of the first major surface of the substrate, wherein the first Fresnel pattern overlaps the second Fresnel pattern in a selected area of the first major surface of the substrate, wherein the first longitudinal axis forms an angle with the second longitudinal axis, wherein the angle is greater than zero degrees, and further wherein the first Fresnel pattern and the second Fresnel pattern interrupt each other in the selected area.

27. An optical assembly comprising:

a base substrate;

an optical film attached to the base substrate, comprising:

a film substrate comprising a first major surface;

a first group of facets corresponding to a first Fresnel pattern formed in a first portion of the first major surface of the film substrate; and a second group of facets corresponding to a second Fresnel pattern formed in a second portion of the first major surface of the film substrate, wherein the first and second Fresnel patterns are refractive Fresnel patterns, and wherein the first Fresnel pattern overlaps the second Fresnel pattern in a selected area of the first major surface of the film substrate, wherein the first Fresnel pattern and the second Fresnel pattern interrupt each other in the selected area.

28. The optical assembly of claim 27, wherein the optical film further comprises a layer of adhesive between a second major surface of the film substrate and the base substrate.

29. The optical assembly of claim 27, wherein the optical film further comprises a layer of adhesive between the first major surface of the film substrate and the base substrate.

30. The optical assembly of claim 27, wherein the base substrate comprises a window.

31. The optical assembly of claim 27, wherein the base substrate comprises a mirror.

32. The optical assembly of claim 27, wherein the base substrate comprises an optical display panel.

* * * * *